United States Patent [19]

Ogawa et al.

[11] Patent Number: 5,580,605
[45] Date of Patent: Dec. 3, 1996

[54] TRANSPARENT SUBSTRATE AND METHOD OF MANUFACTURING THE SAME

[75] Inventors: Kazufumi Ogawa; Norihisa Mino; Mamoru Soga, all of Osaka, Japan

[73] Assignee: Matsushita Electric Industrial Co., Ltd., Osaka, Japan

[21] Appl. No.: 431,578

[22] Filed: May 1, 1995

Related U.S. Application Data

[62] Division of Ser. No. 383,428, Feb. 3, 1995.

[51] Int. Cl.$^6$ ........................................................ B05D 1/38
[52] U.S. Cl. ........................... 427/155; 427/165; 427/209; 427/341; 427/352; 427/353; 427/407.2; 427/412.1
[58] Field of Search ........................... 427/164, 165, 427/209, 337, 340, 341, 154, 155, 353, 352, 387, 407.2, 412.1

[56] References Cited

U.S. PATENT DOCUMENTS

| | | | |
|---|---|---|---|
| 4,810,564 | 3/1989 | Takahashi et al. | 428/213 |
| 5,010,356 | 4/1991 | Albinson | 346/140 R |
| 5,234,718 | 8/1993 | Mino et al. | 427/352 |
| 5,240,774 | 8/1993 | Ogawa et al. | 428/411.1 |
| 5,266,222 | 11/1993 | Willis et al. | 252/49.006 |

FOREIGN PATENT DOCUMENTS 367438  5/1990  European Pat. Off. .

*Primary Examiner*—Shrive Beck
*Assistant Examiner*—Erma Cameron
*Attorney, Agent, or Firm*—Ratner & Prestia

[57] ABSTRACT

At least one monomolecule film is formed on a transparent substrate surface directly or via a protective film. The monomolecule film is formed with chemical coupling of chlorosilane surface active compound, for example, of the formula:

$$F(CF_2)_m(CH_2)_nSiR_qX_{3-q}$$

where m is an integer of from 1 to 15, n is an integer of from 0 to 15 provided that the total of m and n is an integer of from 10 to 30 and R is an alkyl or an alkoxyl group, or $$F(CF_2)_{m'}(CH_2)_{n'}A(CH_2)_pSiR_qX_{3-q}$$

where m' represents an integer ranging from 1 to 8, n' represents an integer ranging from 0 to 2, p represents an integer ranging from 5 to 25, q represents an integer ranging from 0 to 2, X represents a halogen atom or an alkoxyl group, R represents an alkyl or an alkoxyl group, and A represents —O—, a —COO— or —Si(CH$_3$)$_2$—. The transparent substrate such as glass is made hydrophobic and free of contamination.

4 Claims, 7 Drawing Sheets

TRANSPARENT SUBSTRATE AND METHOD OF MANUFACTURING THE SAME

This application is a division of application No. 08/383,428, filed Feb. 3, 1995.

FIELD OF THE INVENTION

This invention relates to a transparent substrate and, more particularly, to a transparent substrate required to be hydrophobic, oil-phobic and/or contamination-free such as motor vehicle and building window glasses, windowshield, optical lenses and glass lenses etc.

BACKGROUND OF THE INVENTION

In order to prevent contaminatoin of a transparent substrate such as glass, it has been proposed to make the surface as smooth as possible or coat the surface with a protective film such as fluorine-base coating film or the like. Further, to prevent fogging of the transparent substrate surface, a hydrophilic polymer is coated, or a heater is installed in or onto transparent substrate.

Where the contamination of a transparent substrate stems from water drops, an antifogging effect can be obtained by installing a heater, for instance. In this case, however, a power source for the heater is necessary. In addition, a heater which is buried in or installed on the surface of the transparent substrate is liable to reduce the transparency thereof. Coating with a hydrophilic polymer or the like is comparatively simple. However, only a tentative effect is achieved, and the hydrophilic polymer may be easily peeled off by rubbing the transparent substrate surface.

Where contamination stems from other causes than water drops, the above methods are substantially meaningless. Accordingly, it has been proposed to coat the transparent substrate surface with a protective film such as a fluorine-based coating film. However, the adhesion between the transparent substrate and the fluorine-based protective film is weak, and the film is readily separated. In addition, the fluorine-based protective film causes fogging of the transparent substrate due to its opaqueness. There are other protective film materials which can improve the transparency and adhesion. However, these materials cannot permit ready wiping-out of contaminants. Accordingly, it is a practical method to make the surface of the transparent substrate as smooth as possible. Limitations, however, are imposed on the smoothness. After all, there has never been a transparent substrate treated to be contamination free, hydrophobic and/or oil-phobic.

SUMMARY OF THE INVENTION

An object of the invention is to provide a highly hydrophobic and contamination free transparent substrate, which is free from attachment of contaminants or capable of being ready removal of contaminants, if attached.

Attempting to attain this object, the invention provides a transparent substrate, which is provided on at least one surface thereof with a chemically adsorbed monomolecule film containing a hydrophobic group.

A first aspect of this invention provides a transparent substrate comprising at least one monomolecule film formed as an outer most surface layer on at least one surface of the transparent substrate either directly or indirectly via a protective film, wherein the monomolecule film contains a hydrophobic group and is bonded through a covalent bond to the surface of the substrate or of the protective film. Preferably, the protective film is itself one or more of such monomolecule film containing a hydrophobic group and bonded through a covalent bond to the surface of the substrate. One difference of the monomolecule film of the protective film from the outer most surface layer monomolecule film is that it is at or near the end of the hydrophobic group, bonded through a covalent bond to the outer most surface layer monomolecule film or to the protective layer monomolecule film one layer closer to the outer most surface.

One preferred embodiment of the first aspect of this invention provides a transparent substrate comprising a monomolecule film formed as an outer surface layer on both surfaces of the transparent substrate either directly or indirectly via a protective film, wherein one (first) of the surface is covered with a monomolecule film containing a hydrophobic group and being covalently bonded to the first surface, and the other (second) surface is covered with a monomolecule film containing a hydrophilic group and being covalently bonded to the second surface.

According to another preferred embodiment of the first aspect of this invention, the monomolecule film is formed by a covalent bond from a silane halide-based or alkoxy silane-based surface active compound of the formula:

$$F(CF_2)_m(CH_2)_nSiR_qX_{3-q} \qquad (A)$$

where m represents an integer ranging from 1 to 15, n represents an integer ranging from 0 to 15, the sum of m and n ranges from 10 to 30, q represents an integer ranging from 0 to 2, R represents an alkyl or an alkoxyl group, and X is a halogen atom or an alkoxyl group; or

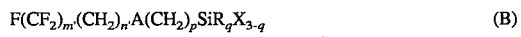

$$F(CF_2)_{m'}(CH_2)_{n'}A(CH_2)_pSiR_qX_{3-q} \qquad (B)$$

where m' represents an integer ranging from 1 to 8, n' represents an integer ranging from 0 to 2, p represents an integer ranging from 5 to 25, q represents an integer ranging from 0 to 2, X represents a halogen atom or an alkoxyl group, R represents an alkyl or an alkoxyl group, and A represents —O—; a —COO— or —Si(CH$_3$)$_2$—.

A second aspect of this invention to provides a method of modifying of a transparent substrate, comprising:

applying, in a non-aqueous organic solvent, a silane-based surface active compound having a reactive silane group at one end and a hydrophobic group at the other end to a surface of the transparent substrate or on a surface of a protective film provided on the transparent substrate under conditions that the silane-based surface active compound is chemically adsorbed to the surface, thereby forming a monomolecule film having the hydrophobic group, —Si— group and being covalently bonded to the applied surface.

One preferred embodiment of the second aspect of this invention provides such a method which comprises:

contacting a surface of a molded transparent substrate with an organic solvent solution of a silane-based surface active compound having a reactive silane group at one end and a hydrophobic group at the other end to form a chemically adsorbed monomolecule film from the silane-based surface active compound on at least one surface of the transparent substrate or over the entire surface area.

Another preferred embodiment of the second aspect of this invention provides such a method which comprises:

contacting both of the surface of the molded transparent substrate with a non-aqueous solvent containing a material having at least two chlorosilyl groups;

washing the transparent substrate using a non-aqueous organic solution to remove the non-reacted material having at least two chlorosilyl groups of the transparent substrate after the contacting step:

treating the transparent substrate with water after the non-reacted material washing step, thereby forming a hydrophilic monomolecule film composed of a silane material having at least one silanol group; and treating the transparent substrate having thus formed silanol groups with silane-based surface active compound having a reactive silane group at one end and a hydrophobic group at the other end, thereby laminating a chemically adsorbed hydrophobic monomolecule film on the hydrophilic monomolecule film having silanol groups.

DETAILED DESCRIPTION OF THE INVENTION

Figure 1:
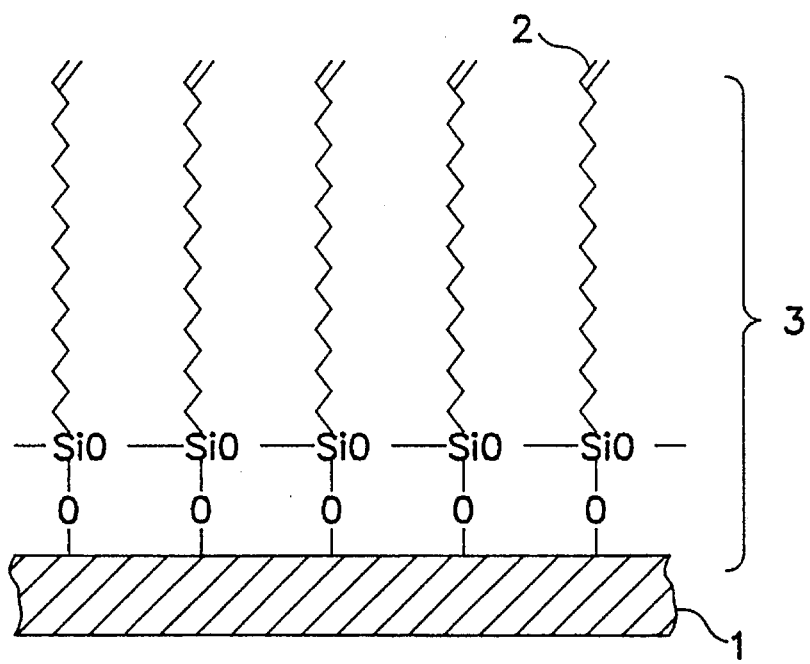
FIG. 1 is a schematic sectional view, enlarged in scale to a molecular level, showing the status of a glass surface in the formation of a chemically adsorbed film.

The transparent substrate is usually made of transparent materials such as glass and plastics. Where the substrate is made of glass, its surface contains hydrophilic groups such as hydroxyl group. Where a plastic is the substrate material, the surface may be readily made hydrophilic by oxidizing treatment. By contacting the substrate material with a non-aqueous organic solvent solution of a compound having a carbon chain and a reactive silane groups at one end, a reaction between an active hydrogen in the hydrophilic groups of the substrate surface and the reactive silane group take to form a monomolecule film via bonded by a —SiO— group containing chemical bond (i.e., a covalently bonded). Such a reaction is called as a chemical adsorption reaction, and the monomolecule film obtained in this way is called a chemically adsorbed single molecule (or unimolecule or monomolecule) film. When this chemically adsorbed monomolecule film is coupled via firm chemical bonds to a real image side mirror surface, its adhesion is so strong that usually it is not separated unless the surface of the transparent substrate is cut away. Since the compound has a hydrophobic group at the other end, this hydrophobic property provides a contamination free effect.

As noted before, as the transparent substrate material according to the invention, a plastic material such as acrylic resin and polycarbonate resin may be used in addition to glass, although glass is most usual and extensively used. The surface of the transparent substrate according to the invention has to have an exposed hydrophilic group. Examples of the hydrophilic group are those having active hydrogen, e.g., a hydroxyl group, a carbonyl group, an amino group, an imino group, etc. Where the transparent substrate surface dose have a sufficient amount of a hydrophilic group, it is rendered hydrophilic by usual means such as electron or ion beam irradiation in an oxygen or nitrogen atmosphere.

The molecule constituting the chemically adsorbed monomolecule film may be a silane-based surface active compound having a chlorosilane ($—SiCl_vY_{3-v}$) group or an alkoxysilane ($Si(OW)_vY_{3-v}$) group at one end and a hydrocarbon group or fluorine-substituted carbon at the other end. In the above formulas, v represents an integer ranging from 1 to 3, Y represents a hydrogen atom or a lower alkyl (for example $C_1$ to $C_6$) or lower alkoxyl group (for example $C_1$ to $C_6$), and W represents a lower alkyl group. Among the silane-based surface active compounds mentioned above, chlorosilane-based surface active compounds are preferred, since they can reliably undergo a chemical adsorption reaction to form a chemically adsorbed monomolecule film at normal temperature. Among the chlorosilane-based surface active compounds, those having a trichlorosilane group (v is 3) is preferred because siloxane bounds intervene between adjacent adsorbed molecules. Further, in order to increase the concentration of the adsorbed molecule, the silane-based surface active compound having a straight chain is preferred. Examples of especially preferred chlolosilane-based surface active compounds are those represented by the formulas:

$$R^1—SiCl_vY_{3-v} \quad\quad (C)$$

and

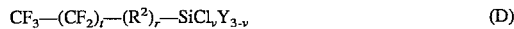

$$CF_3—(CF_2)_t—(R^2)_r—SiCl_vY_{3-v} \quad\quad (D)$$

where t is an integer of at least 0, preferably 0 to 10, r is 0 or 1, $R^1$ is an alkyl group of at least 6 (preferably 8 to 22) carbon atoms which may contain a vinyl ($CH_2=CH—$) or ethynyl ($CH\equiv C—$) group or may be interrupted by a COO group or by a silicon or oxygen atom, $R^2$ is an alkylene group of at least one (preferably 1 to 20) carbon atoms which may contain a vinylene ($—CH=CH—$), ethynylene ($—C\equiv C—$) group or may be interrupted by a COO group or by a silicon or oxygen atom, and Y is a hydrogen atom, a lower alkyl group (for example $C_1$ to $C_6$) or lower alkoxyl group (for example $C_1$ to $C_6$), and v is an integer ranging from 0 to 2. Preferably, those chlorosilane-based surface active compounds have 12 to 22 carbon atoms. More specific examples include:

$CH_3(CH_2)_9SiCl_3$, $CH_3(CH_2)_{15}SiCl_3$, $CH_3CH_2O(CH_2)_{15}SiCl_3$, $CH_3(CH_2)_2Si(CH_3)_2(CH_2)_{15}SiCl_3$, $CF_3(CF_2)_7(CH_2)_2SiCl_3$, $CF_3CH_2O(CH_2)_{15}SiCl_3$, $CF_3(CH_2)_2Si(CH_3)_2(CH_2)_{15}SiCl_3$, $CF_3(CF_2)_3(CH_2)_2Si(CH_3)_2(CH_2)_9Si\,Cl_3$, $CF_3COO(CH_2)_{15}SiCl_3$, $CF_3(CF_2)_5(CH_2)_2SiCl_3$.

Those surface active compounds in which $R^1$ in the above formulas contains a vinyl or ethynyl group are preferred, since by causing a polymerization of unsaturated bond with a catalyst or with light or high energy ray irradiation, intra-molecular bonds may be produced, which result in a firmer monomolecule film. Further, those chlorosilane-based surface active compounds having a hydrophobic group containing a fluoro-carbon group are particularly preferred, since the resulting monomolecule film is highly hydrophobic as well as an oil-phobic effect (i.e., oil-repellant).

The transparent substrate according to the invention is usually manufactured from a molded transparent substrate. When the chlorosilane-based surface active material is used, the chemically adsorbed monomolecule film usually has to be washed without contacting with water after it is formed. Unless this process is executed, the remaining unreacted chlorosilane-based surface active compound reacts with water component and becomes whitish.

Further, particularly the chlorosilane-based surface active compound has to be dissolved in a non-aqueous (substantially non-water) organic solvent because it is highly reactive with water component. Examples of such solvent are n-hexadecane, toluene, xylene, dicyclohexyl, carbon tetrachloride, chloroform, or freon 113, etc. These solvents may be used used either alone or in combination. It is possible to use methyl alcohol or ethyl alcohol as the solvent in case of other silane-based surface active compounds than those based on chlorosilane.

Figure 9:
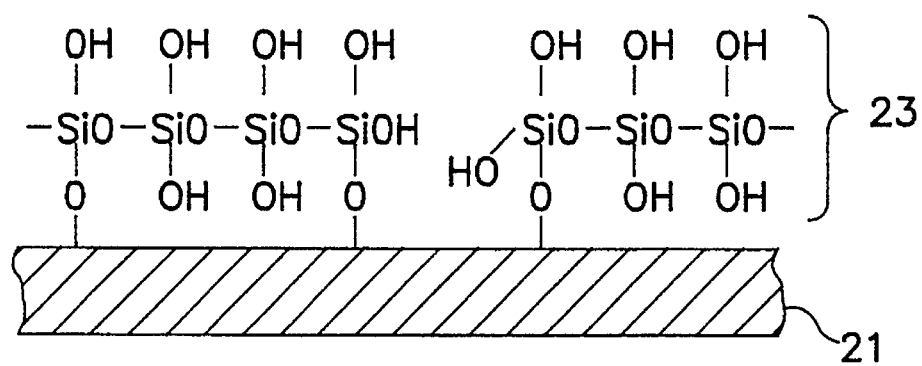
FIG. 9 is a schematic sectional view, enlarged in scale to the molecule level, showing a windshield glass as a further embodiment of the transparent substrate according to the invention.

To form the chemically adsorbed monomolecule film according to the invention, in a preferred embodiment, one surface of the transparent substrate may be contacted with a material having at least two chlorosilyl groups, before a silane-based surface active compound containing a hydrophobic group is chemically adsorbed on the transparent substrate surface. The material having at least two Cl-Si groups reacts with an active hydrogen-containing group of the transparent substrate so unreacted Cl-Si group or groups remain in the reacted material. The surface of the transparent substrate thus-treated is washed with an organic solution to remove the unreacted material containing at least two chlorosilyl groups. The surface is then treated with water (washing with water or exposing to air to react with moisture in the air) to form a monomolecule film containing silanol groups (Si-OH) on the surface of the substate (see FIG. 9).

This is desirable in that a silane-based surface active compound can be chemically adsorbed at a high concentration even when the substrate has only a very small quantity of a hydrophilic group, such as a quartz glass or tempered glass. Examples of the material having at least two chlorosilyl groups are:

$SiCl_4$, $SiHCl_3$, $SiH_2Cl_2$, $Cl—(SiCl_2O)_xSiCl_3$, and $H_i(R^3)_{3-i}Si(R^4)_iSiCl_k(R^5)_{3-k}$.

It is usually desired that number of Cl-Si bonds is as large as possible for high concentration chemical adsorption of the silane-based surface active compound containing hydrophobic groups. In the above formulas, i represents an integer such as 1 to 4, l and k represent each an integer ranging from 1 to 3, $R^3$ and $R^5$ are lower-alkyl groups, and $R^4$ represents an alkylene group with a carbon number of at least 1 such as 1 to 6. Preferably those materials have 3 or 4 Cl-Si bonds and are inorganic. $SiCl_4$ is most preferred as the material containing a chlorosilyl group, such it is a very small molecule and is highly reactive for producing silanol groups, thus being highly effective for making the quartz glass surface uniformly hydrophilic.

It is possible to form a chemically adsorbed monomolecule film containing a hydrophobic group on only one surface of transparent substrate and form a chemically adsorbed monomolecule film containing a hydrophilic group on the other surface, thus obtaining a substrate with has different characters on the opposite sides. Such a substrate may be obtained by chemically adsorbing the abovementioned material containing a chlorosilane group on both surfaces of a transparent substrate, then treating the surface (such as washing) to form silanol groups on the surface, then coating the surface, one of the surfaces, on which it is desired to leave a hydrophilic monomolecule film, with an aqueous solution of a water-soluble polymer material, e.g., polyvinyl alcohol or pullulan, then forming a chemically adsorbed monomolecule film containing a hydrophobic group on the other surface of the substrate and subsequently washing away the water-soluble polymer material with water.

The chemically adsorbed monomolecule film according to the invention may be either a single monomolecule layer or a lamination of two or more monomolecule layers. In the latter case, however, it is necessary that there are chemical bonds between adjacent laminated layers. For producing such a lamination of monomolecule layers, one preferred method is as follows. At first a chlorosilane-based surface active compound (for example, of the formula (C) mentioned above) having a group (such as a vinyl or ethynyl group) that can subsequently be converted to an active hydrogen-containing reactive group (such as a hydroxyl, imino or amino group) is used to form a monomolecule film. The convertible group is then converted to the active hydrogen-containing reactive group. To a surface thus treated, a chlorosilane-based surface active compound is applied to form a hydrophobic monomolecule film.

With the transparent substrate according to the invention, the chemically adsorbed monomolecule film formed on the substrate surface is as thin as of the order of the nanometer (nm) and does not spoil the the intrinsic transparency of the substrate. In addition, the chemically adsorbed monomolecule film according to the ivention has hydrophobic property and is not susceptible to surface contamination. Further, by forming a chemically adsorbed hydrophobic monomolecule film on one surface of a transparent substrate and forming a chemically adsorbed hydrophilic monomolecule film on the other surface of the substrate, a transparent substrate which has a hydrophobic and contamination-free effects on one surface and an antifogging effect on the other surface can be obtaibed.

This invention can be applied to a variety of materials including a display-form touchi pannel switch, a face plate for photocopy machine, a fresnel plate for an overhead projector, a display glass, a display optical filter, a halogen lamp, a mercury lamp, a sodium lamp, an electric bulb, a chandelier, a glass or plastic lens, a microscope lens, a telescope lens, a binocular lens, a magnifying glass lens and all sorts of apparatus lenses.

This invention will now be illustrated with reference to the following examples and the drawings, but the scope of the invention is no means limited the these examples.

EXAMPLE 1

In to a chloroform solution containing 80 wt % n-hexadecane and 12 wt % carbon tetrachloride a silane-based surface active compound represented by a formula:

$$CH_2=CH-(CH_2)_{16}-SiCl_3$$

containing vinyl groups $(CH_2=CH-)_2$ (see FIG. 1) is dissolved to a concentration of $3\times10^{-3}$ to $5\times10^{-2}$ Mol., and a glass substrate 1 as a transparent was dipped into the solution and held at room temperature for one hour. Since the surface of the glass substrate 1 contained a number of hydroxyl groups, a reaction took place between chlorosilyl groups (—SiCl) in the chlorosilane-based surface active compound and the hydroxyl groups (—OH) and a bond represented such as formula 1;

$$CH_2=CH-(CH_2)_{16}-SiCl_3 + (-OH) \longrightarrow \quad \text{Formula 1}$$

$$CH_2=CH-(CH_2)_{16}-\underset{\underset{Cl}{|}}{\overset{\overset{Cl}{|}}{Si}}-O- \; + HCl$$

is formed on the substrate surface.

The glass substrate 1 was then washed by freon 113 to remove the material remaining on the surface without reaction, followed by washing with water or exposing to air to react with moisture in the air. The —SiCl group was changed to a —SiOH group as in formula 2.

$$CH_2=CH-(CH_2)_{16}-\underset{\underset{Cl}{|}}{\overset{\overset{Cl}{|}}{Si}}-O- \; + 2H_2O \longrightarrow \quad \text{Formula 2}$$

$$CH_2=CH-(CH_2)_{16}-\underset{\underset{OH}{|}}{\overset{\overset{OH}{|}}{Si}}-O- \; + 2HCl$$

Each silanol group (—SiOH) was then dehydrated and crosslinked to form a siloxan bond (—SiO—) as in formula 3.

$$nCH_2=CH-(CH_2)_{16}-\underset{\underset{OH}{|}}{\overset{\overset{OH}{|}}{Si}}-O- \longrightarrow \quad \text{Formula 3}$$

$$nCH_2=CH-(CH_2)_{16}-\underset{\underset{O-}{|}}{\overset{\overset{O-}{|}}{Si}}-O- \; + nH_2O$$

Figure 2:
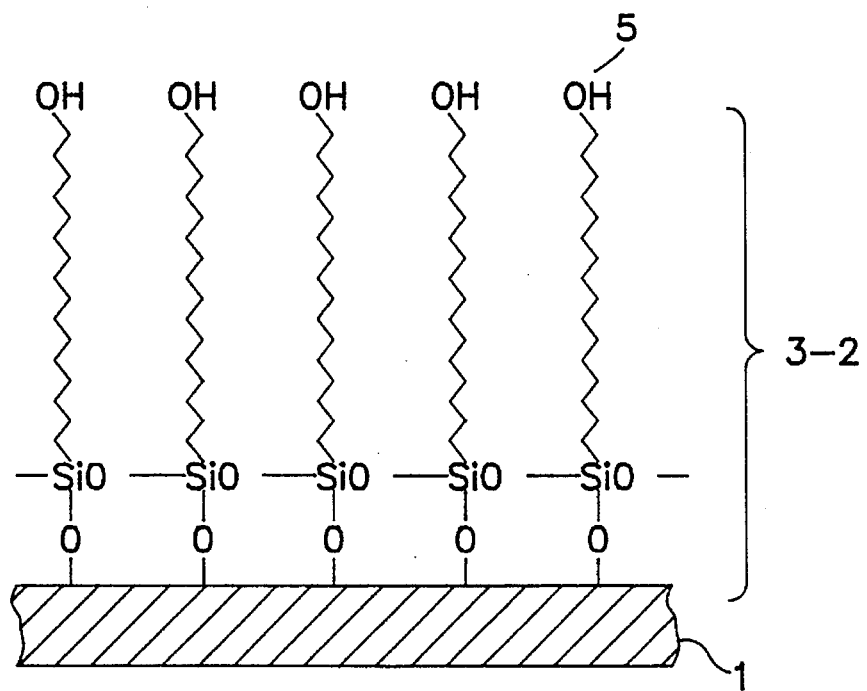
FIG. 2 is a schematic sectional view, enlarged in scale to the molecular level, showing the status of a glass surface in the formation of a chemically adsorbed film.
Figure 3:
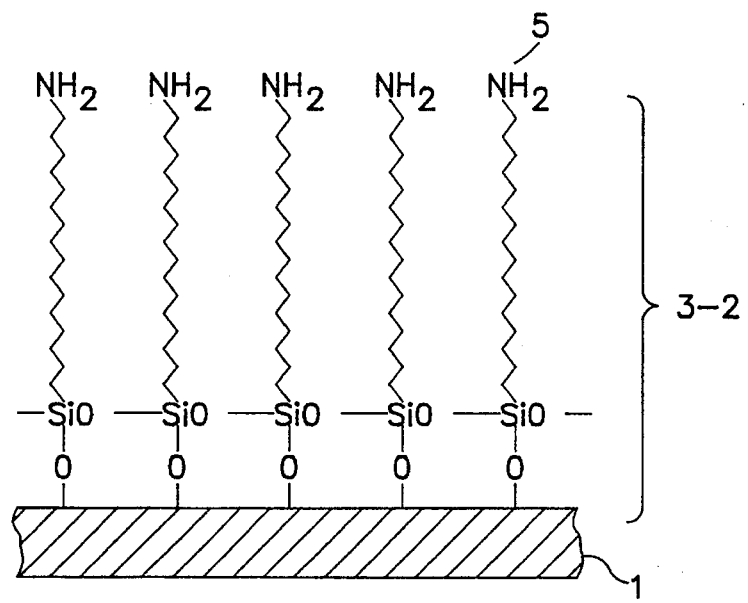
FIG. 3 is a schematic sectional view, enlarged in scale to the molecular level, showing the status of a glass surface in the formation of a chemically adsorbed film.

Thus, an adsorbed monomolecule protective film 3 containing a vinyl group 2 was formed as a single layer with a thickness from 2 to 3 nm on the surface in a chemically coupled form via oxygen atoms (see FIG. 1). The glass substrate is then irradiated in an atmosphere containing oxygen or $N_2$ (or in air) with about 3 Mrads of an energy beam (e.g., electron beam, X-rays, gamma ($\gamma$) rays, ultraviolet (UV) rays or ion beam), thus providing the vinyl group portion 2 with a hydroxyl (—OH) groups 4 (in case of oxygen atmosphere) as shown in FIG. 2 or amino (—$NH_2$) group 5 (in case of nitrogen atmosphere) as shown in FIG. 3. Those hydroxyl, amino, and/or imino groups may be formed where air is the atmosphere.

The fact that these functional groups are attached to vinyl groups is confirmed from FT-IR analysis.

It is possible to process the vinyl groups arranged on the surface in plasma containing $O_2$ or $N_2$ as well to form an adsorbed monomolecule protective film 3-1 with attached —OH groups as shown in FIG. 2 or an adsorbed monomolecule protective film 3-2 with attached —$NH_2$ groups as shown in FIG. 3.

Finally, a solution of a mixed solvent composed of 80 wt % n-hexane, 12 wt % carbon tetrachloride and 8 wt % chloroform was prepared by dissolving a silane-based surface active compound containing fluorine represented by a formula:

$$F(CF_2)_m(CH_2)_n SiR_q X_{3-q} \quad (A)$$

where m represents an integer ranging from 1 to 15, n represents an integer ranging from 0 to 15, the sum of m and n ranges from 10 to 30, q represents an integer ranging from 0 to 2, R represents an alkyl or an alkoxyl group, and X is a halogen atom or an alkoxyl group; or $$F(CF_2)_{m'}(CH_2)_{n'} A(CH_2)_p SiR_q X_{3-q} \quad (B)$$

where m' represents an integer ranging from 1 to 8, n' represents an integer ranging from 0 to 2, p represents an integer ranging from 5 to 25, q represents an integer ranging from 0 to 2, X represents a halogen atom or an alkoxyl group, R represents an alkyl or an alkoxyl group, and A represents —O—, a —COO— or —Si(CH_3)_2—, for instance:

$$CF_3CH_2O(CH_2)_{15}SiCl_3,$$

in a concentration of the order of $2\times10^{-3}$ to $5\times10^{-2}$ Mol., and the glass substrate with the adsorbed monomolecule protective film 3-1 or 3-2 formed thereon was dipped in to the solution and held for one hour. Since —OH group, —NH group or —$NH_2$ group was exposed on the substrate surface as shown in FIG. 2 or 3, with the dipping a reaction was brought about between the chlorosilyl group of the chlorosilane-based surface active compound containing fluorine and the —OH, —NH or —$NH_2$ groups, thus producing covalent bonds represented such as formula 4 on the surface.

$$CF_3CH_2O(CH_2)_{15}SiCl_3 + (-OH) \longrightarrow \quad \text{Formula 4}$$

$$CF_3CH_2O(CH_2)_{15}\underset{\underset{O-}{|}}{\overset{\overset{O-}{|}}{Si}}O-$$

This reaction proceed substantially the same as above in formulas 1 to 3.

Figure 4:
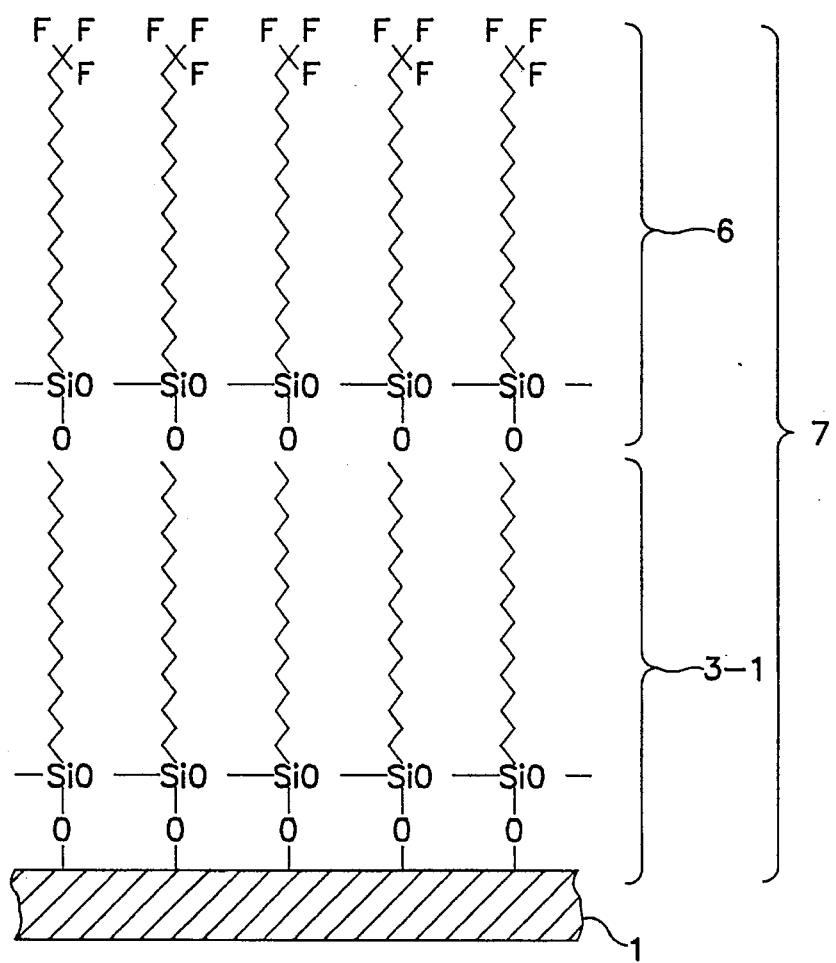
FIG. 4 is a schematic sectional view, enlarged in scale to the molecular level, showing the status of a glass surface in the formation of a chemically adsorbed film.
Figure 5:
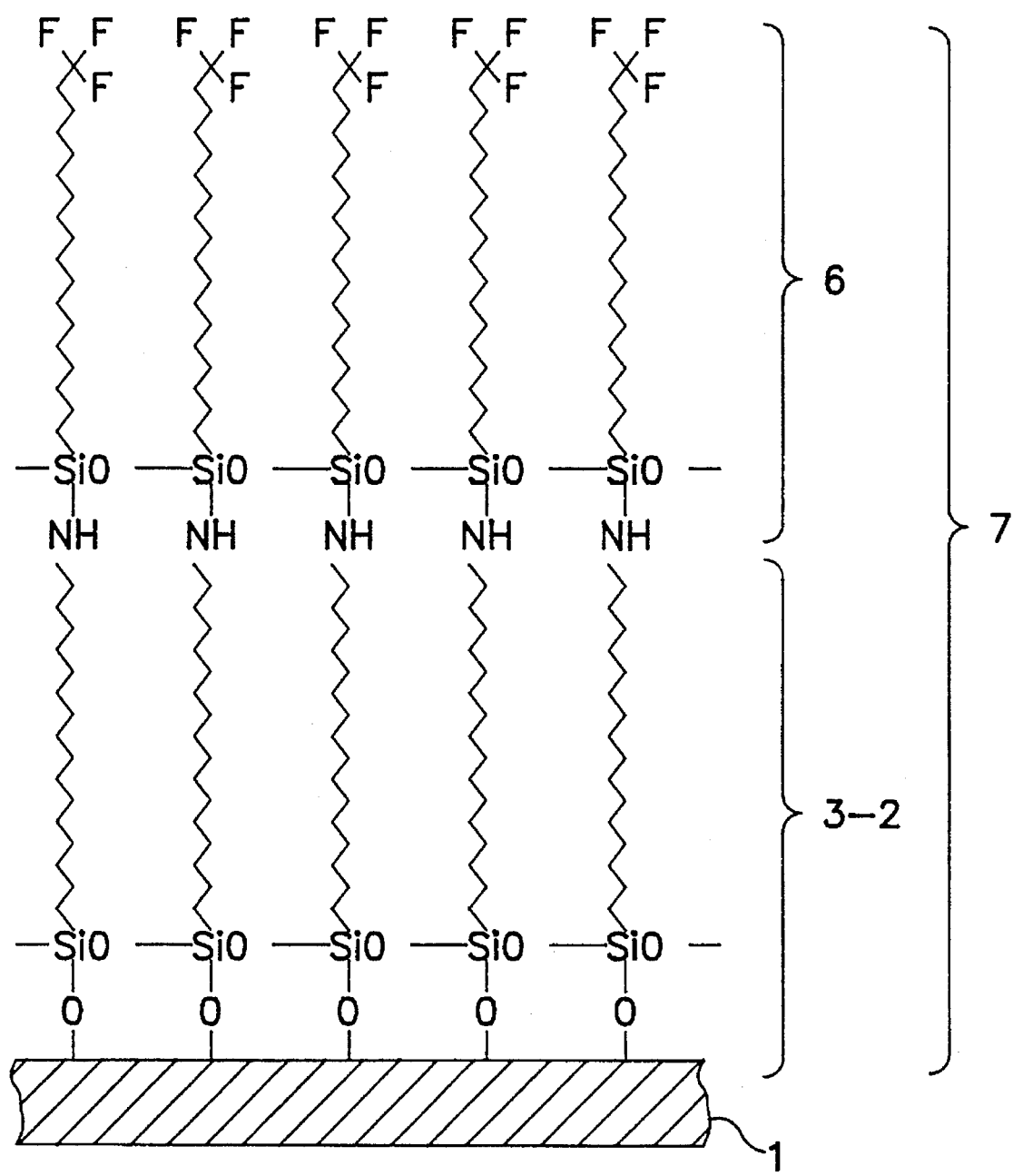
FIG. 5 is a schematic sectional view, enlarged in scale to the molecular level, showing the status of a glass surface in the formation of a chemically adsorbed film.

Thus, a highly concentration monomolcule film lamination 7 was on the surface of the glass substrate such that an adsorbed monomolecule film 6 containing fluorine was chemically bonded to a lower adsorbed monomolecule film 3-1 as shown in FIG. 4 or to a lower adsorbed monomolecule film 3-2 as shown in FIG. 5.

Where no monomolecule film is required between hydrophobic oil-phobic surface film and glass substrate, a chlorosilane-based surface active compound may be used for the first adsorption to form an adsorbed monomolecule protective film. By so doing, only a single layer of adsorbed monomolecule protective film containing fluorine on the surface can be formed.

Where a plurality of monomolecule films are necessary as protective films, $CH_2=CH-(CH_2)_nSiCl_3$ may be used as chemical adsorption reagent, the steps of chemical adsorption and radiation irradiation may be repeated, and finally a chlorosilane-based surface active compound containing fluorine may be adsorbed as a chemical reagent. By so doing, a hydrophobic oil-phobic film constituted by a single layer of adsorbed monomolecule film containing fluorine formed on the surface via a plurality of necessary protective films can be obtained.

In the above embodiment, $CF_3CH_2O(CH_2)_{15}SiCl_3$ was used as a silane-based surface active compound containing fluorine uter most surface. However, it is possible to use other compounds as well, for instance;

$CF_3(CH_2)_2Si(CH_3)_2(CH_2)_{15}SiCl_3$, $CF_3(CF_2)_3(CH_2)_2Si(CH_3)_2(CH_2)_9SiCl_3$, $CF_3COO(CH_2)_{15}SiCl_3$, and $CF_3(CF_2)_7(CH_2)_2SiCl_3$.

Figure 6:
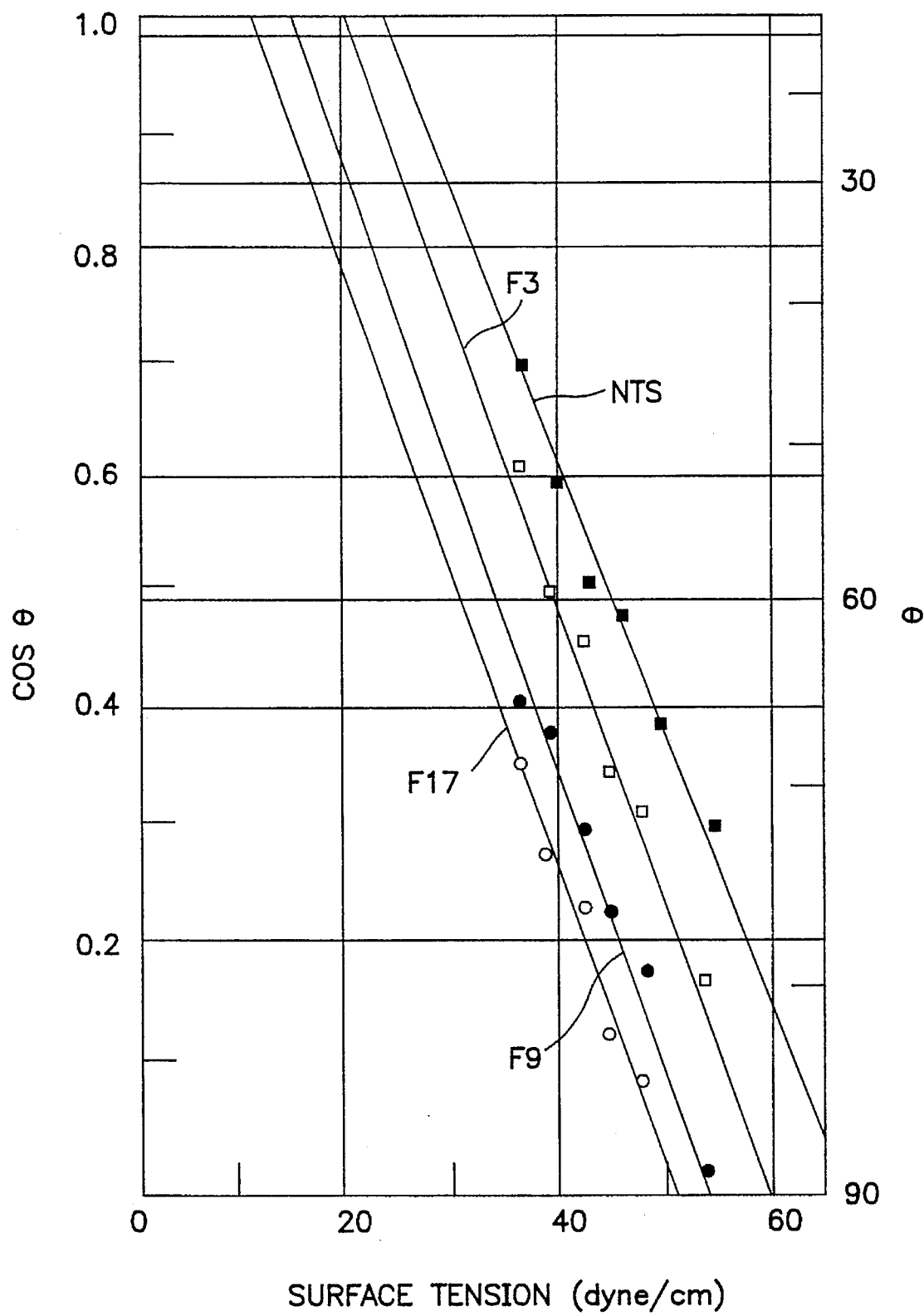
FIG. 6 is a graph showing the surface tension or energy in various chemically adsorbed films.

The surface energy or tension in the adsorbed monomolecule film was measured by evaluation of the water dip angle of contact (with an automatic contact angle gauge manufactured by Kyowa Kaimen Kagaku Co.). The results are shown in FIG. 6. FIG. 6 is a graph showing relations between cos θ and surface tension.

As is seen from FIG. 6, the surface energy is reduced as the number of fluorine atom increases. It is confirmed that when the number of fluorine atom is 9 or more, the surface tension of the film is lower than that of polytetrafluoroethylene and that the surface is very highly hydrophobic and oil-phobic.

The water wetting angle measured the surfaces of the adsorbed film was found 140 to 150 degrees.

Thus, by using such glasses, it would be possible to provide a wiperless moter vehicle windshild or windscreen glasses and also prevent fogging of glass lens surface.

In FIG. 6, labeled F17, F9, F3 and NTS designate adsorbed monomolecular films respectively of;

F17; $CF_3(CF_2)_7(CH_2)_2-Si(CH_3)_2(CH_2)_9SiCl_3$

F9; $CF_3(CF_2)_3(CH_2)_2O(CH_2)_{15}SiCl_3$

F3; $CF_3COO(CH_2)_{15}SiCl_3$ and

NTS; $CH_3(CH_2)_{19}SiCl_3$.

The above embodiment concerned with tempered glass, but the invention is applicable to all the glasses aiming to improve the quality of the glass surfaces of window glasses used for vehicles, electric cars, aircrafts and other means of transport, mirrors, glass vessels, glass or plastic lenses, etc. and also other -glass or plastic surfaces required to be hydrophobic and oil-phobic.

Further, while the above embodiment concerned with the adsorbed monomolecule films as glass protective films, the transparent substrate according to the invention is by no means limited to glass, but it may of course be protective films having functions as light-blocking film, ultraviolet absorption film and infrared absorption film as well.

Further, the glass is not limited to colorless transparent glass, but the invention is applicable to roughened surfaces and also to colored glass and glass fibers.

In general, the invention is applicable to all techniques of chemical coupling of glass having hydrophilic groups on the surface and a silane-based surface active compuond containing a fluorophobic by using a chemical adsorption process.

Where the surface of protective film or transparent substrate itself is not hydrophilic, the silane-based surface active compound containing a hydrophobic group according to the invention may be provided after making the surface hidrophilic by usual means such as corona discharge in an atmosphere containing oxygen or spattering.

The chlorosilane-based surface active compound, in one preferred embodiment, is represented by a formula;

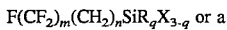
$F(CF_2)_m(CH_2)_nSiR_qX_{3-q}$ or a

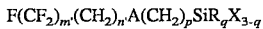
$F(CF_2)_{m'}(CH_2)_{n'}A(CH_2)_pSiR_qX_{3-q}$

When such compound is employed, a highly concentration very thin organic film can be formed substantially pin hole free, with a uniform thickness in a hydrophobic oil-phobic monomolecule film chemically coupled to the glass substrate surface. The symbols in the above formulas (A) and (B) are as defined hereinbefore.

It is thus possible to effect a very highly durable surface treatment for prevention of contamination, fogging and wetting of the glass surface.

EXAMPLE 2

As transparent substrate, a moter vehicle windshield or windscreen glass was washed with an organic solution. Meanwhile, as a material containing fluorocarbon group and a chlorosilane group, a compound of the formula:

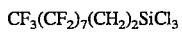
$CF_3(CF_2)_7(CH_2)_2SiCl_3$ was dissolved in a non-aquaous solvent, i.e., a mixed solvent composed of 80 wt % of n-hexadecane, 12 wt % of carbon tetrachloride and 8 wt % of chloroform to a concentration of 2 wt %. The windshield glass was dipped into the solution and held for about 2 hours. The windshield glass had numerous hydroxyl groups on the surface, and thus a dehydrochlorination reaction was brought about between the chlorine in chlrosilyl (—SiCl) group of the material containing a fluorocarbon group and a chlorosilane group and a hydroxyl group and covalent bonds represented by formula 5 below were formed over the entire surface of the windshield glass. This reaction prceeded substatially the same as above in formulas 1 to 3.

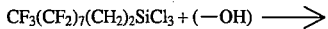
$CF_3(CF_2)_7(CH_2)_2SiCl_3 + (-OH) \longrightarrow$     Formula 5

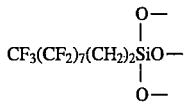
$$CF_3(CF_2)_7(CH_2)_2Si\begin{matrix}O- \\ | \\ O- \\ | \\ O-\end{matrix}$$

Figure 7:
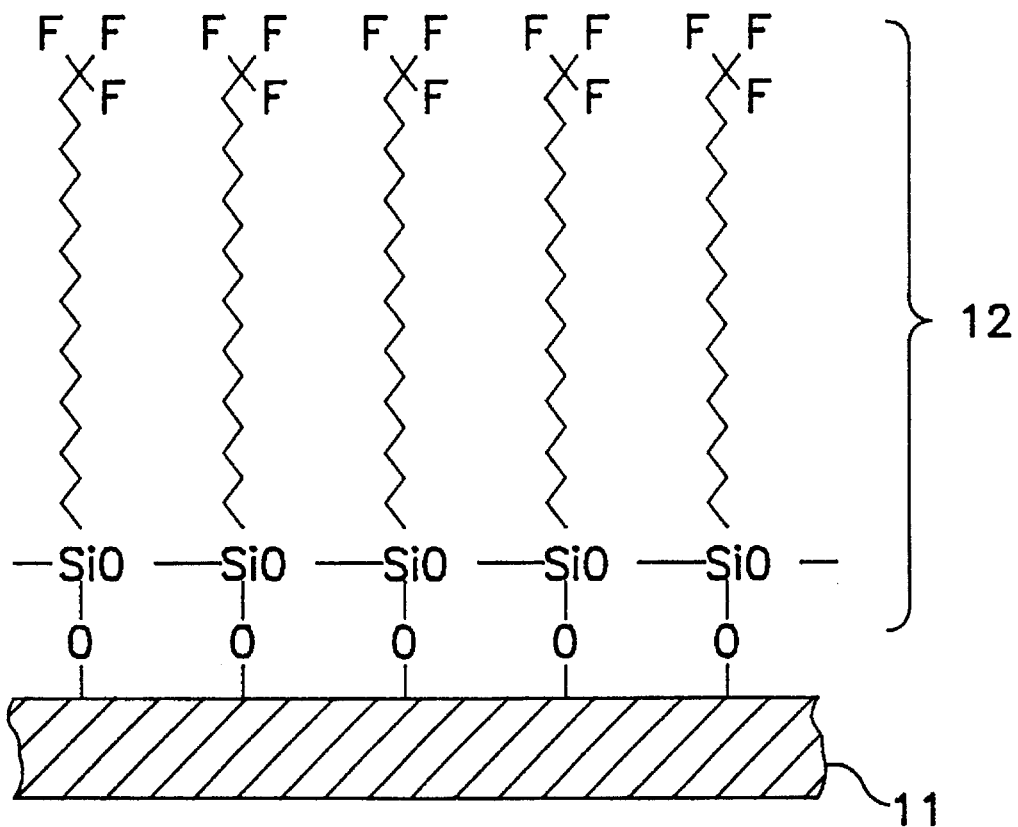
FIG. 7 is a schematic sectional view, enlarged in scale to the molecule level, showing surface of a windshield glass as an embodiment of the transparent substrate according to the invention.

Thus, a single layer of chemically adsorbed monomolecule film 12 containing fluorine was formed in a state chemically coupled to the windshield glass 11 by siloxane bonds, as shown in FIG. 7. The thickness of this chemically adsorbed monomolecule film was assumed from the molecular structure to be about 1.5 nm. The monomolecule film was chemically coupled very firmly.

The resultant windshield glass was actually used for the test purpose. Its contamination was found to be greatly reduced compared to those without the above-described treatment. Contaminant, if attached, could be easily removed by merely rubbing the glass with a brush or the like. Doing so produced neither scars nor scratches on the surface of the windshield glass 11. Further, it was possible to remove oily contaminants by merely washing with water.

Where plastic materials such as polyacrylic resins and polycarbonate resins were used as the material of the transparent substrate, similar techniques could be used by treating the surface by, for instance, a plasma treatment at 300 W for about 10 minutes to make the surface oxidized and hydrophilic while replacing the adsorption liquid with a freon 113.

EXAMPLE 3

Figure 8:
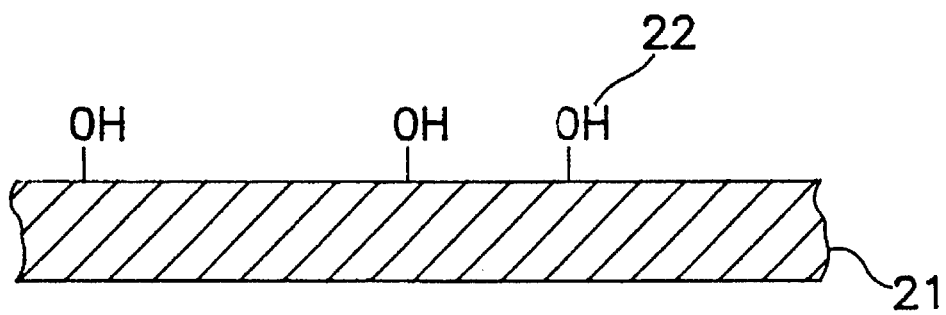
FIG. 8 is a schematic sectional view, enlarged in scale to the molecule level, showing the surface of a windshield glass as a different embodiment of the transparent substrate according to the invention.

As solution by dissolving about 1 wt. % of $SiCl_4$ as a material containing chlorosilyl groups in a chloroform solvent as a non-aqueous solvent was prepared. A windshied glass with the surface containing less hydroxyl groups although hydrophilic, e.g., an annealedly tempered glass was dipped into the solution and held for about 30 minutes. Then a dehydrochlorizing reaction was brought about on the surface of the windshield glass 21 due to the presence of some hydroxyl (—OH) groups 2 as hydrophilic groups on the surface, as shown in FIG. 8. A chlorosilane monomolecule film constituted by a material containing chlorosilyl groups was formed. It will be seen that by using $SiCl_4$ as a material containing chloosilyl groups, a dehydrochloration reaction was brought about on the surface of the windshield glass 21 even in a presence of only a small amount of hydrophilic OH groups 22 on the surface of the front window glass 21, and molecules as given such as formula 6 and 7 are secured to the surface via —SiO— bonds.

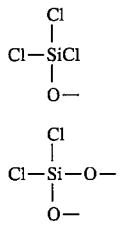

Formula 6

Formula 7

In this case, usually non-reacted $SiCl_4$ is also present on the chlorosilane monomolecule film. However, by subsequently washing the surface of the windshield glass 21 with chloroform as a non-aqueous solvent and then with water, the hydroxyl groups and non-reacted $SiCl_4$ molecules on the surface can be removed to obtain on the surface a siloxane monomolecule film 23 represented such as formula 8 and 9 as shown in FIG. 5.

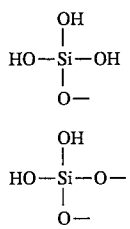

Formula 8

Formula 9

The monomolecule film 23 formed in this case is completely coupled to the surface of the windshield glass 21 via chemical bonds of —SiO—, and therefore it is never separated. In addition, the siloxane monomolecule film 23 thus obtained has numerous surface —SiOH bonds roughly corresponding in number to about three times the number of the initial hydroxyl groups.

Now, in the solution mentioned before in connection with the Example 2 was dipped and held for about one hour, the windshield glass 21 having the siloxane monomolecule film 23 formed on the surface. As a result, bonds as shown such as above formula 5 were formed on the surface of the siloxane monomolecule film 23.

Figure 10:
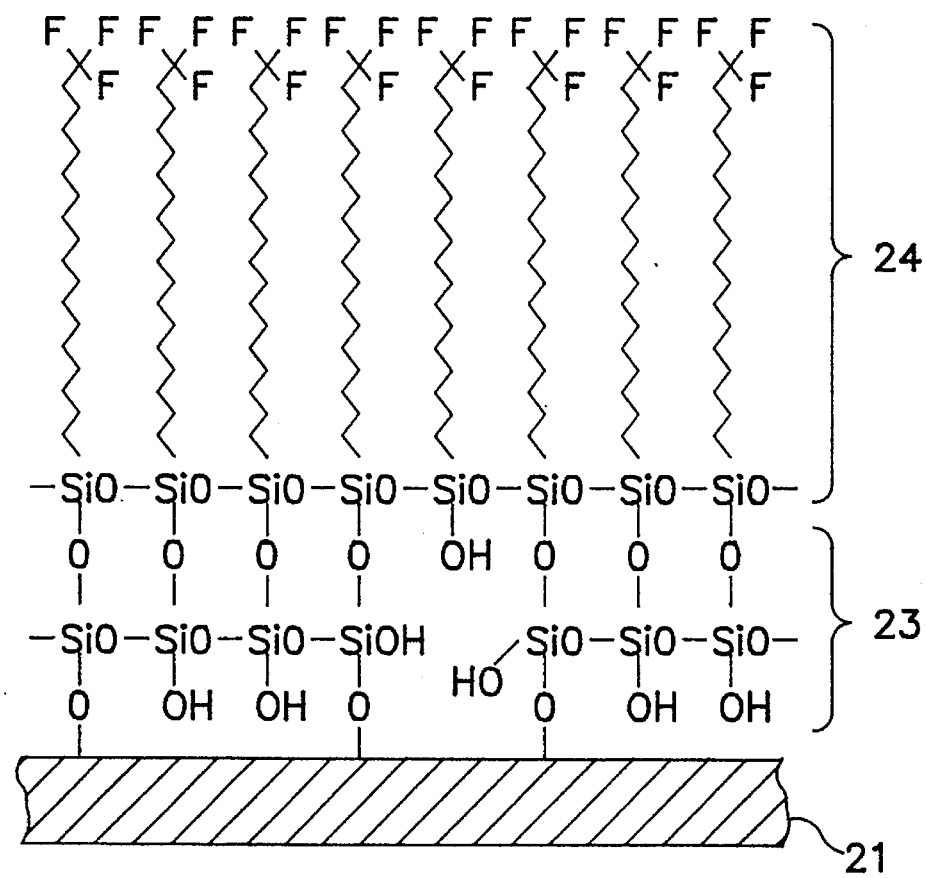
FIG. 10 is a schematic sectional view, enlarged in scale to the molecule level, showing the surface of a windshield glass as a still further embodiment of the transparent substrate according to the invention.

Thus, a chemically adsorbed monomolecule film 24 containing fluorine was formed to a thickness of about 1.5 nm. over the entire glass surface in a state chemically coupled to the lower siloxane monomolecule film 23, as shown in FIG. 10. A separation test proved that the monomolecule film is never separated.

The windshield glass of this example was actually trial used, and no water drops were attached owing to the hydrophobic effect of the surface fluorine. Acetone containing wax was blown against the glass by assuming the flow of wax component. It was found that oil was repelled and no fogging was produced owing to the effect of the oil-phobic property of fluorine in the monomolecule film chemically adsorbed to the surface. In addition, contaminants that were attached could be easily wiped away.

EXAMPLE 4

As transparent substrate, a display-form touch pannel glass (switch of CRT glass) having been processed was prepared and washed with an organic solvent. Meanwhile, as a material containing carbon fluoride groups and chlorosilane groups

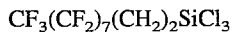

was dissolved to a concentration of 1 wt % in a non-aquaous solvent, i.e., a mixed solvent containing 80 wt. % of n-hexadecane, 12 wt % of carbon tetrachloride and 8 wt. % of chloroform. The CRT glass was dipped into the solution and held for about 2 hours. The CRT glass had numerous hydroxyl groups on the surface, and thus a dehydrochlorination reaction was brought about between the chlorine in —SiCl groups of the material containing carbon fluoride groups and chlorosilane groups and hydroxyl groups to produce bonds represented by above formula 5 below over the entire surface of the CRT glass. This reaction proceed substantially the same as above in formulas 1 to 3.

Thus, a single layer of chemically adsorbed monomolecule film containing fluorine was formed in a state chemically coupled (i.e., covalentry bonded) to the CRT glass by siloxane bonds. The thickness of this chemically adsorbed monomolecule film was assumed from the molecular structure to be about 1.5 nm. The monomolecule film was chemically coupled very firmly and was never separated.

The resultant CRT glass was actually trial used. Its contamination was found to be greatly reduced compared to those without treatment. Contaminant, if attached, could be easily removed by merely wiping the glass with a paper or the like. Doing so produced neither scars nor scratches on the surface of the CRT glass.

EXAMPLE 5

In the case of a fresnel plate glass for overhead projector with the surface containing less hydroxyl groups although hydrophilic, e.g., an annealedly tempered glass, by holding the glass dipped for about 30 minutes in a solution by dissolving about 1 wt. % of $SiCl_4$ as a material containing chlorosilyl groups in a chloroform solvent as a non-aqueous solvent, a dehydrochlorizing reaction was brought about on the surface of the fresnel plate glass due to the presence of some hydroxyl (—OH) groups as hydrophilic groups (inner layer film) on the surface. As the inner layer film forming material, $SiHCl_3$, $SiH_2Cl_2$, $Cl$—$(SiCl_2O)_nSiCl_3$ (n being integer) could be used in place of the above $SiCl_4$.

A chlorosilane monomolecule film (inner layer) constituted by a material containing chlorosilyl groups was formed. It will be seen that by using $SiCl_4$ as a material containing chlorosilyl groups, a dehydrochloration reaction was brought about on the surface of the fresnel plate glass even in a presence of only a small amount of hydrophilic OH groups on the surface of the fresnel plate glass, and molecules as given by above formulas 6 and 7 are secured to the surface via —SiO— bonds.

In this case, usually non-reacted $SiCl_4$ is also present on the chlorosilane monomolecule film. Thereafter, by subsequently washing the surface of the fresnel plate glass with chloroform as a non-aqueous solution and then washing with water, the hydroxyl groups and non-reacted $SiCl_4$ molecules on the surface can be removed to obtain on the surface a siloxane monomolecule film represented such as above formulas 8 and 9.

Further, as a material containing carbon fluoride groups and chlorosilane groups;

$CF_3(CF_2)_7(CH_2)_2SiCl_3$ was dissolved to a concentration of 2 wt. % in a non-aquaous solvent i.e., a mixed solvent containing 80 wt % of n-hexadecane, 12 wt. % of carbon tetrachloride and 8 wt. % of chloroform. The glass was dipped into the solution and held for about 1 hour. The glass had numerous hydroxyl groups on the surface, and thus a dehydrochlorination reaction was brought about between the chlorine in —SiCl groups of the material containing carbon fluoride groups and chlorosilane groups and hydroxyl groups to produce bonds represented by above formula 5 below over the entire surface of the glass.

Thus, the chemically adsorbed monomolecule film containing fluorine was formed in a state chemically coupled to the glass by siloxane bonds. The thickness of this chemically adsorbed monomolecule film was assumed from the molecular structure to be about 1.5 nm. The monomolecule film was chemically coupled very firmly and was never separated.

Figure 11:
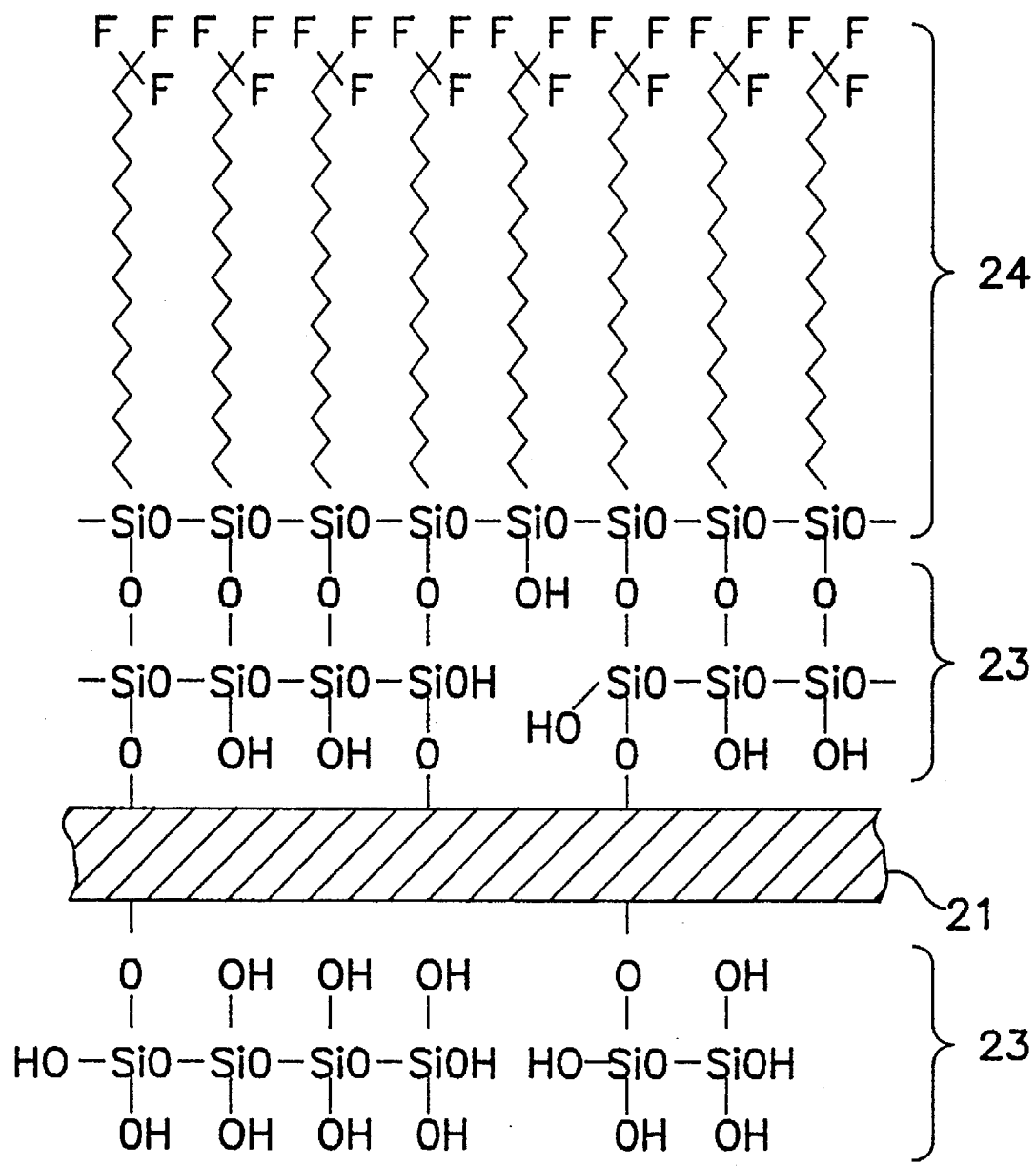
FIG. 11 is a schematic sectional view, enlarged in scale to the molecule level, showing the surface of a windshield glass as a yet further embodiment of the transparent substrate according to the invention.

When chemically adsorbing a monomolecule film using a non-aqueous solvent incorporating carbon fluoride groups and chlorosilane groups, an aqueous solution containing polyvinl alcohol was coated as a hydrophilic film having resistance against an oganic solvent on the surface which was desired to be left hydrophilic in order to impart an antifogging effect. After the adsorption was over, the hydrophilic film was washed with water, thus obtaining a windshield glass with a hydrophobic, oil-phobic contamination free monomolecule film 24 formed on one surface and a monomolecule film 23 containing hydrophilic hydroxyl groups on the other surface, as shown in FIG. 11. The antifogging effect of this glass was tested, and it was found that the glass surface left hydrophilic was never fogged.

In Example 2, only a single layer of monomolecule film was formed, and in Example 3 only a single layer of silane-based surface active compound containing fluorine was formed after formation of a single layer of siloxane monomolecule film. However, the same effects can be obtained by laminating a plurality of chemically adsorbed monomolecule films according to the invention instead of forming only a single layer.

Further, while the above example used $CF_3(CF_2)_7(CH_2)_2SiCl_3$, by adding or incorporating vinylene (—CH=CH—) or ethynylene (—C≡C—) groups to or in portion represented as R in chlorosilane-based surface active compound represented as $CF_3(CF_2)_r$—$(R^2)_y$—$SiCl_yX_{3-y}$, (wherein the symbols are as defined before) crosslinking can be obtained with about 5 Mrads of electron beam after the formation of the monomolecule film for further improvement of the hardness of the monomolecule film.

As the carbon fluoride surface active compound could be used in addition to the above trichlorosilane-based surface active compounds such as;

$CF_3CH_2O(CH_2)_{15}SiCl_3$,
$CF_3(CH_2)_2Si(CH_3)_2(CH_2)_{15}SiCl_3$,
$CF_3(CF_2)_3(CH_2)_2Si(CH_3)_2(CH_2)_9Si$
$Cl_3$,
$CF_3COO(CH_2)_{15}SiCl_3$,
$CF_3(CF_2)_7(CH_2)_2SiCl_3$,
$CF_3(CF_2)_5(CH_2)_2SiCl_3$, and chlorosilane-based surface active compounds such as;

$CF_3CH_2O(CH_2)_{15}Si(CH_3)_2Cl$,
$CF_3(CH_2)_2Si(CH_3)_2Cl$,
$CF_3CH_2O(CH_2)_{15}Si(CH_3)Cl_2$,
$CF_3COO(CH_2)_{15}Si(CH_3)_2Cl$, and chlorosilane-based surface active compounds of containing methoxy group such as;

$CF_3CH_2O(CH_2)_{15}Si(OCH_3)_2Cl$,
$CF_3(CH_2)_2Si(OCH_3)_2Cl$,
$CF_3CH_2O(CH_2)_{15}Si(OCH_3)Cl_2$, and
$CF_3COO(CH_2)_{15}Si(OCH_3)_2Cl$.

The same effects could be obtained with such alkoxysilane-based surface active compounds as $CF_3(CF_2)_7(CH_2)_2Si(OCH_3)_3$, and $CF_3CH_2O(CH_2)_{15}Si(OCH_3)_3$ by heating the surface active compound solution. Further, with chlorosilane-based surface active compounds having hydrocarbon groups such as;

$CH_3(CH_2)_9SiCl_3$,
$CH_3(CH_2)_{15}SiCl_3$,
$CH_3CH_2O(CH_2)_{15}SiCl_3$, and
$CH_3(CH_2)_2Si(CH_3)_2(CH_2)_{15}SiCl_3$, chemically adsorbed monomolecule film was similarly formed at room temperature to obtain the hydrophobic and contamination free effects.

As has been described in the foregoing, according to the invention a very thin transparent hydrophbic monomolecule film in the nanometer order is formed on the transparent glass surface, and therefore the gloss which is intrinsic to the transparent glass is not spoiled. Further, the hydrophobic monomolecule film is highly hydrophobic and oil-phobic and can enhance the repellency to contamination of the surface. It is thus possible to provide a very highly contamination free high performance transparent glass. Further, an antifogging effect could be obtained by leaving the other surface hydrophilic.

According to the invention, by using a chemical adsorption method, a hydrophobic monomolecule film with a small thickness of the nanometer level can be formed on the surface of a transparent substrate without spoiling gloss and transparency thereof. If the hydrophobic monomolecule film contains a fluorocarbon gruop, it has excellent hydrophobic and oil-phobic properties and permits improvement of surface contamination prevention effect. It is also possible to form a chemically adsorbed monomolecule film having hydrophobic and contamination prevention properties on one surface and a chemically adsorbed monomolecule film containing hydrophilic groups on the other surface and thus provide a transparent substrate having different natures on the opposite sides.

Thus, it is possible to provide a transparent substrate, which is highly antifogging, hydrophobic, oil-phobic and contamination free.

The invention may be embodied in other specific forms without departing from the spirit or essential or essential characteristics thereof. The present invention is therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. A method of modifying a transparent substrate having two surfaces, comprising:

(A) contacting the surfaces of the transparent substrate with a first non-aqueous solution containing a material having at least two chlorosilyl groups;

(B) washing the transparent substrate using a second non-aqueous solution to remove a non-reacted material of said material having at least two chlorosilyl groups on the transparent substrate after the contacting step;

(C) treating the transparent substrate with water, thereby forming a hydrophilic monomolecular film composed of a silane material having at least one silanol group; and (D) treating the transparent substrate having thus formed silanol groups with a silane-based surface active compound having a silane group at one end and a hydrophobic group at the other end, thereby laminating a chemically adsorbed hydrophobic monomolecular film on the hydrophilic monomolecular film.

2. The method according to claim 1, which further comprises between the steps (C) and (D), coating one surface of the transparent substrate with a water-soluble coating film and, after the step (D), removing the water soluble coating film, thereby forming the hydrophobic monomolecular film on one surface and the hydrophilic monomolecular film on the other surface.

3. The method according to claim 1, wherein the silane group selected from a halosilyl group and an alkoxysilyl group is a chlorosilyl group or an alkoxysilyl group.

4. The method according to claim 1, wherein the material having at least two chlorosilyl groups is selected from the group consisting of:

$SiCl_4$, $SiHCl_3$, $SiH_2Cl_2$, and $Cl-(SiCl_2O)_n SiCl_3$
where n is an integer of 1 to 4.

\* \* \* \* \*

UNITED STATES PATENT AND TRADEMARK OFFICE
CERTIFICATE OF CORRECTION

PATENT NO. : 5,580,605
DATED : December 3, 1996
INVENTOR(S) : Kazufumi Ogawa, NOrihisa Mino and Mamoru Soga It is certified that error appears in the above-identified patent and that said Letters Patent is hereby corrected as shown below:

On the title page, insert

--[30]    Foreign Application Priority Data

Dec. 25, 1990 [JP]    Japan    2-405755
Feb. 6, 1991   [JP]    Japan    3-038135--

Signed and Sealed this

Sixteenth Day of February, 1999

Attest:

*Acting Commissioner of Patents and Trademarks*

*Attesting Officer*